US012715164B2

(12) United States Patent
Otsuji et al.

(10) Patent No.: US 12,715,164 B2
(45) Date of Patent: Aug. 25, 2026

(54) MOLDING CYCLE STOPPING METHOD, INJECTION DEVICE, AND INJECTION MOLDING MACHINE

(71) Applicant: THE JAPAN STEEL WORKS, LTD., Tokyo (JP)

(72) Inventors: Yasutaka Otsuji, Tokyo (JP); Takashi Akagi, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 154 days.

(21) Appl. No.: 18/611,266

(22) Filed: Mar. 20, 2024

(65) Prior Publication Data

US 2024/0316844 A1 Sep. 26, 2024

(30) Foreign Application Priority Data

Mar. 24, 2023 (JP) ................................ 2023-047555

(51) Int. Cl.

*B29C 45/17* (2006.01)
*B29C 45/74* (2006.01)
*B29C 45/76* (2006.01)
*B29C 45/77* (2006.01)
*B29C 45/78* (2006.01)

(52) U.S. Cl.

CPC .......... *B29C 45/1753* (2013.01); *B29C 45/74* (2013.01); *B29C 45/762* (2013.01); *B29C 45/78* (2013.01); *B29C 45/77* (2013.01); *B29C 2945/76006* (2013.01); *B29C 2945/7604* (2013.01); *B29C 2945/76428* (2013.01); *B29C 2945/76441* (2013.01); *B29C 2945/76531* (2013.01); *B29C 2945/76668* (2013.01); *B29C 2945/76906* (2013.01)

(58) Field of Classification Search

CPC ...... B29C 45/1753; B29C 2945/76428; B29C 2945/76906

See application file for complete search history.

(56) References Cited

U.S. PATENT DOCUMENTS

| | | | | |
|---|---|---|---|---|
| 3,601,854 | A * | 8/1971 | Trueblood | .......... B29C 45/1753 425/557 |
| 2016/0361855 | A1* | 12/2016 | Shiraishi | ................. B29C 45/74 |
| 2023/0022193 | A1 | 1/2023 | Kozuka | |

FOREIGN PATENT DOCUMENTS

| | | | |
|---|---|---|---|
| JP | H02169225 | A * | 6/1990 |
| JP | 2005-246682 | A | 9/2005 |
| JP | 2010099995 | A * | 5/2010 |
| JP | 2015-164782 | A | 9/2015 |

(Continued)

OTHER PUBLICATIONS

Translation of JP-H02169225-A (Year: 1990).*

(Continued)

*Primary Examiner* — John J DeRusso
(74) *Attorney, Agent, or Firm* — Sughrue Mion, PLLC

(57) ABSTRACT

A molding cycle stopping method includes: in a case of stopping an operation of a molding cycle in an injection device including a heating cylinder and a screw provided in the heating cylinder, performing a temperature lowering process including lowering a temperature of the heating cylinder from a molding cycle execution temperature to a standby temperature; and performing a continuous purge process including repeatedly purging a resin until a predetermined termination condition is satisfied.

12 Claims, 7 Drawing Sheets

(56) References Cited

FOREIGN PATENT DOCUMENTS

| | | | | | |
|---|---|---|---|---|---|
| JP | 2018-111297 A | | 7/2018 | | |
| KR | 20200067438 A | * | 6/2020 | ............. | B29C 45/18 |

OTHER PUBLICATIONS

Translation of JP-2010099995-A (Year: 2010).*
Translation of JP 2015-164782 (“Okamoto”) (Year: 2015).*
Translation of KR-20200067438-A (Year: 2020).*
European Extended Search Report issued Sep. 4, 2024 by the European Patent Office for EP Patent Application No. 24165479.7.

* cited by examiner

MOLDING CYCLE STOPPING METHOD, INJECTION DEVICE, AND INJECTION MOLDING MACHINE

CROSS-REFERENCE TO RELATED APPLICATIONS

This application is based on and claims priority under 35 USC 119 from Japanese Patent Application No. 2023-047555 filed on Mar. 24, 2023, the entire content of which is incorporated herein by reference.

TECHNICAL FIELD

The present disclosure relates to a molding cycle stopping method for shifting a molding cycle from an operation state to a stop state in an injection molding machine, an injection device including a molding cycle stopping process, and an injection molding machine.

BACKGROUND

An injection molding machine includes a mold clamping device for clamping a mold, an injection device for melting an injection material and injecting the material into the mold, and the like. The injection device includes a heating cylinder and a screw placed in the heating cylinder. When the heating cylinder is heated by a heater and a resin is supplied from a hopper while rotating the screw, the resin is melted and fed to the front of the heating cylinder. That is, the resin is metered. An injection nozzle provided at a distal end of the heating cylinder is brought into contact with the clamped mold, and the screw is driven in an axial direction. As a result, the resin is injected into the mold to obtain a molded product.

Methods for operating an injection molding machine that can produce a high-quality molded product are proposed in various patent literature. For example, JP2018-111297A proposes a method for operating an injection molding machine when starting a molding cycle from a state where the injection molding machine is stopped. In the method for operating described in JP2018-111297A, the number of times of molding cycles required from the start of the molding cycle to the stabilization of the molding, that is, the number of times to stabilization is estimated. The number of times to stabilization is obtained by dividing an amount of resin remaining in the heating cylinder when the heating cylinder is stopped by an amount of resin injected in one molding cycle. The resin can be purged by an injection operation until the number of times to stabilization is reached. In a molding cycle after the number of times to stabilization, a resin that does not deteriorate can be injected, so that a high-quality molded product can be obtained.

SUMMARY

As in the method described in JP2018-111297A, if the method for operating an injection molding machine when starting the molding cycle from a stop state of the molding cycle is implemented, a molded product can be molded without using the resin remaining in the heating cylinder during a stop period. This should result in a high-quality product. However, there is also a problem to be solved. For example, a molded product molded by injection molding includes an optical product such as lenses mounted on mobile phones. Such an optical product cannot be adopted as a product even if a slightest amount of so-called contamination, such as inclusion of a black spot, occurs. When the molding cycle stops for a long time, the resin remaining in the heating cylinder is likely to deteriorate. When the resin deteriorates, even if the resin is purged for a number of times equal to or more than the number of times to stabilization, there is a risk that a part of the deteriorated resin remains in the heating cylinder, and the quality of a molded product cannot be guaranteed.

The present disclosure provides a molding cycle stopping method that prevents deterioration of a resin in a heating cylinder.

Other problems and novel features will become apparent from description of the present description and the accompanying drawings.

One illustrative aspect of the present disclosure provides a method of stopping an operation of a molding cycle in an injection device including a heating cylinder and a screw provided in the heating cylinder. The molding cycle stopping method includes performing a temperature lowering process including lowering a temperature of the heating cylinder from a molding cycle execution temperature to a standby temperature, and performing a continuous purge process including repeatedly purging a resin until a predetermined termination condition is satisfied.

The present disclosure can reliably prevent the resin in the heating cylinder from deteriorating.

DETAILED DESCRIPTION

Figure 1:
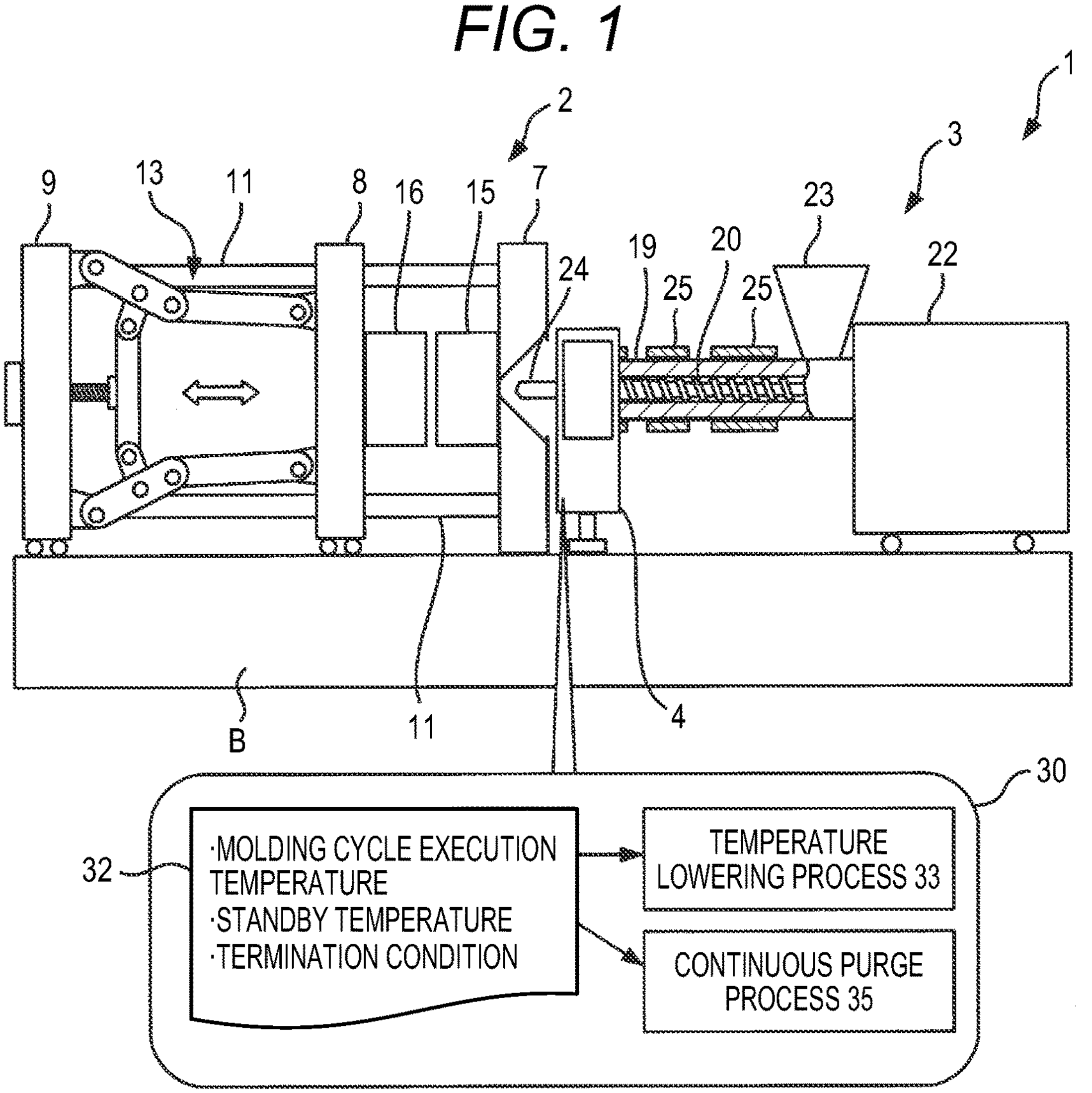
FIG. 1 is a front view of an injection molding machine according to a first illustrative embodiment, including a molding cycle stopping process software group according to the first illustrative embodiment.

Hereinafter, specific illustrative embodiments will be described in detail with reference to the drawings. The present invention is not limited to the following illustrative embodiments. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

First Illustrative Embodiment

{Injection Molding Machine}

As shown in FIG. 1, an injection molding machine 1 according to a first illustrative embodiment includes a mold clamping device 2 provided on a bed B, an injection device 3 provided on the bed B and on a side of the mold clamping device 2, and a control device 4 configured to control the mold clamping device 2 and the injection device 3. The control device 4 includes not only an operation terminal equipped with a monitor shown in FIG. 1 but also a programmable controller, a control panel, and the like provided in the bed B, although not shown in the drawings. However, the operation terminal equipped with the monitor in FIG. 1 is shown and described as the control device 4 for convenience.

{Mold Clamping Device}

The mold clamping device 2 includes a fixed plate 7, a movable plate 8, and a mold clamping housing 9. The fixed plate 7 is fixed to the bed B. The movable plate 8 is slidably provided on the bed B. The fixed plate 7 and the mold clamping housing 9 are connected by a plurality of tie bars 11, 11, . . . . The movable plate 8 is freely slidable between the fixed plate 7 and the mold clamping housing 9. A mold clamping mechanism, that is, a toggle mechanism 13 in the present illustrative embodiment is provided between the mold clamping housing 9 and the movable plate 8. The fixed plate 7 and the movable plate 8 are provided with a fixed mold 15 and a movable mold 16, respectively. Accordingly, the molds 15 and 16 are opened and closed when the toggle mechanism 13 is driven.

{Injection Device}

The injection device 3 includes a heating cylinder 19, a screw 20 provided in the heating cylinder 19, and a screw driving device 22. The heating cylinder 19 is supported by the screw driving device 22. The screw 20 is driven by the screw driving device 22 in a rotational direction and an axial direction. The heating cylinder 19 is provided with a hopper 23 and an injection nozzle 24. Further, heaters 25, 25, . . . are provided in the heating cylinder 19.

Figure 2:
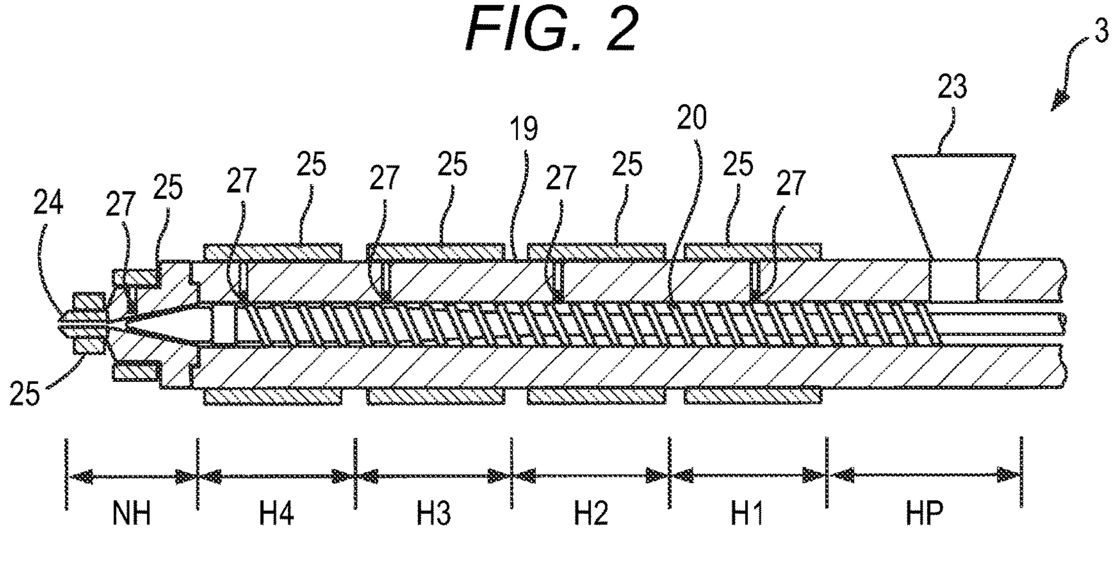
FIG. 2 is a front cross-sectional view of an injection device according to the first illustrative embodiment.

FIG. 2 is an enlarged view of a part of the injection device 3. The heating cylinder 19 is divided into a plurality of zones along a length direction thereof. That is, a hopper zone HP in which the hopper 23 is provided, and a first zone H1, a second zone H2, a third zone H3, and a fourth zone H4 are arranged downstream from the hopper zone HP. A zone in which the injection nozzle 24 is provided is a nozzle zone NH which is one zone in this illustrative embodiment. However, the zone in which the injection nozzle 24 is provided may also be divided into a plurality of zones.

Among the zones HP, H1, . . . of the heating cylinder 19, zones H1, H2, . . . other than the hopper zone HP are provided with heaters 25, 25, . . . and temperature sensors 27, 27, . . . respectively. The temperatures of the respective zones HP, H1, . . . can be independently controlled by the heaters 25, 25, . . . and the temperature sensors 27, 27, . . . .

{Molding Cycle Stopping Process Software Group}

As shown in FIG. 1, the control device 4 of the injection molding machine 1 according to the first illustrative embodiment has a molding cycle stopping process software group 30 according to the first illustrative embodiment. As will be described in detail later, the molding cycle stopping process software group 30 is a software group that performs a molding cycle stopping process for shifting a molding cycle from an operation state to a stop state in the injection molding machine 1. The molding cycle stopping process software group 30 includes a control program that operates in the control device 4 and various setting data. Specifically, the molding cycle stopping process software group 30 includes a setting information file 32 in which various setting data is stored, a temperature lowering process 33 which is a control program, and a continuous purge process 35 which is also a control program. It should be noted that these are configuration shown for convenience of explanation, and other files, control programs, and the like may also be used for configuration.

In the first illustrative embodiment, the following setting data is stored in the setting information file 32.

Molding Cycle Execution Temperature

The molding cycle execution temperature is a target temperature for controlling the heating cylinder 19 during operation of the molding cycle. The molding cycle execution temperature is set for each of the zones HP, H1, H2, . . . . For example, when the injected resin is polycarbonate, 290° C. is set for the first zone H1, and 300° C. is set for the second zone H2.

Standby Temperature

The standby temperature is a temperature of the heating cylinder 19 in the stop state of the molding cycle. The standby temperature is a temperature at which the resin maintains a molten state, temperature at which there is no risk of deterioration even if the molten state is maintained for a long time. For example, when the resin is polycarbonate, the temperature is set to 160° C., 170° C. and the like. An appropriate standby temperature is a temperature up to +30° C. from the glass transition point or melting point of the resin, preferably a temperature up to +10° C. to +20° C. from the glass transition point or melting point.

Termination Condition

The molding cycle stopping process software group 30 according to the first illustrative embodiment repeats purging by the continuous purge process 35 when shifting the molding cycle to the stop state. The termination condition is a condition for terminating the continuous purge process 35. Although various conditions can be adopted as the termination conditions, in the first illustrative embodiment, an injection pressure abnormality generally provided in the injection molding machine 1 is adopted as the termination condition. In the injection molding machine 1, when the screw 20 is driven to inject the resin, an axial force acting on the screw 20, that is, injection pressure is monitored. When the injection pressure is higher than a normal range, it is detected as an injection pressure abnormality and an alarm is output. In the first illustrative embodiment, when the screw 20 is driven to purge, if the injection pressure abnormality occurs, it is assumed that the termination condition has been met and the purge is terminated.

{Molding Cycle Stopping Process}

The molding cycle stopping process according to the first illustrative embodiment will be described. When the operator performs a stop operation in the control device 4, the molding cycle stopping process according to the first illustrative embodiment is performed. Specifically, the control device 4 performs the temperature lowering process 33 and the continuous purge process 35 to be described below in parallel as the molding cycle stopping process.

{Temperature Lowering Process}

Figure 3A:
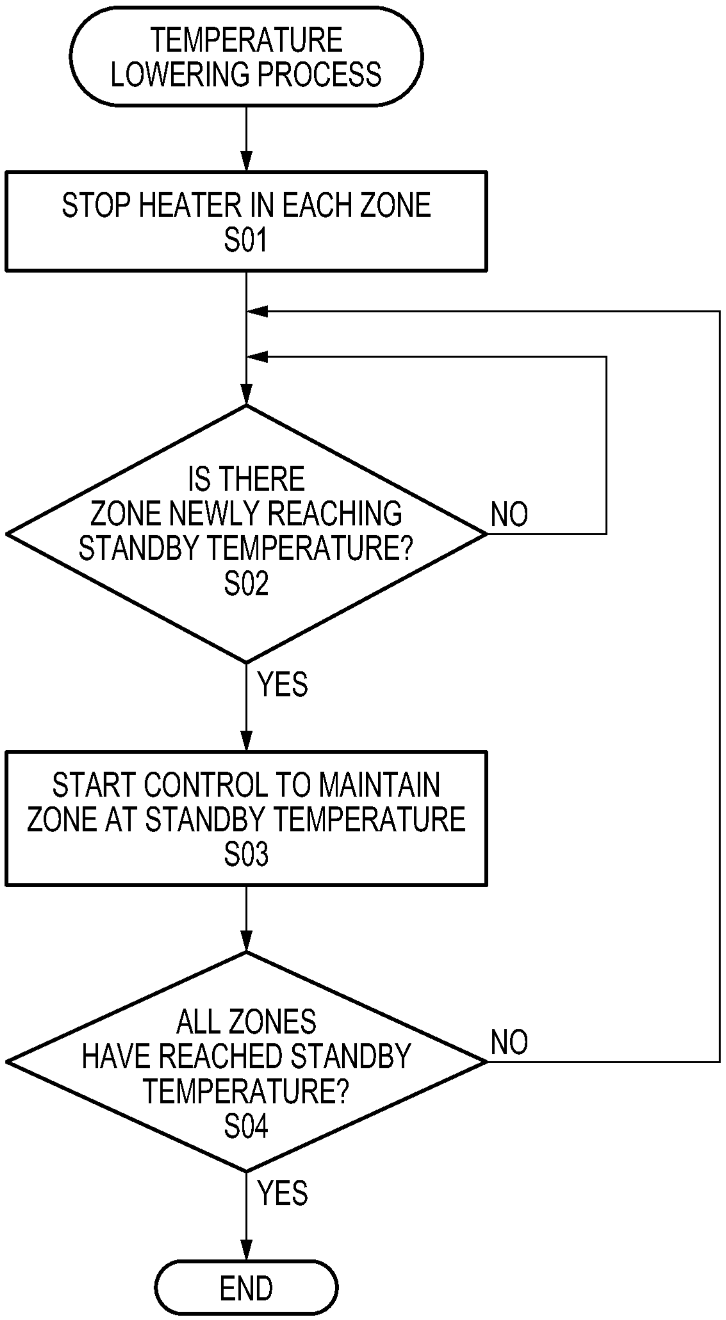
FIG. 3A is a flowchart showing a temperature lowering process in the molding cycle stopping process according to the first illustrative embodiment.

In the temperature lowering process 33 according to the first illustrative embodiment, step S01 is first executed as shown in FIG. 3A. That is, the heaters 25, 25, . . . in the respective zones H1, H2, . . . (see FIG. 2) are stopped. When the heaters 25, 25, . . . are stopped, the temperatures of the respective zones H1, H2, . . . decrease. The temperature lowering process 33 executes step S02 to check whether there is a zone reaching the standby temperature among the zones H1, H2, . . . . If there is no zone reaching the standby temperature among the zones H1, H2, . . . (NO), step S02 is repeated. If there is a zone reaching the standby temperature among the zones H1, H2, . . . (YES), the process proceeds to step S03.

In step S03, for the zones H1, H2, . . . reaching the standby temperature, temperature control is switched such that the standby temperature is set as the target temperature. That is, the zones H1, H2, . . . reaching the standby temperature are maintained at the standby temperature thereafter. Next, the temperature lowering process 33 executes step S04 to check whether all the zones H1, H2, . . . have reached the standby temperature. If there is a zone not reaching the standby temperature among the zones H1, H2, . . . (NO), the process returns to step S02. That is, monitoring is continued until a zone that newly reaches the standby temperature appears among the zones H1, H2, . . . . On the other hand, if all the zones H1, H2, have reached the standby temperature (YES), the temperature lowering process 33 is completed.

{Continuous Purge Process}

Figure 3B:
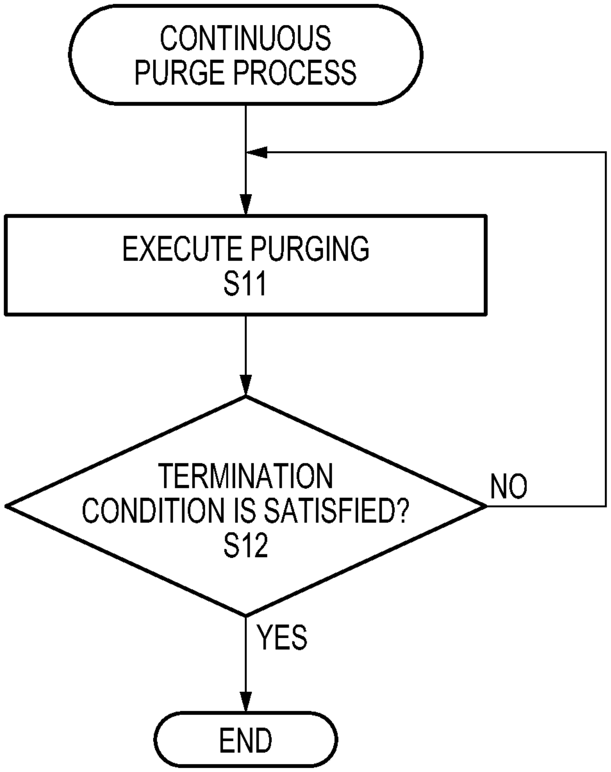
FIG. 3B is a flowchart showing a continuous purge process in the molding cycle stopping process according to the first illustrative embodiment.

The continuous purge process 35 (see FIG. 1) according to the first illustrative embodiment is executed by the control device 4 in parallel with the above-described temperature lowering process 33 according to the first illustrative embodiment. In the continuous purge process 35 according to the first illustrative embodiment, first, as shown in FIG. 3B, the purging is executed in step S11. In the purging, there is also a method in which the screw position is fixed and the screw 20 (see FIG. 1) is rotated to discharge the resin from the injection nozzle 24. However, here, the purging is performed by a metering operation and an injection operation. That is, the metering operation is executed in which the screw 20 is rotated and the resin is metered at a distal end of the screw 20, and after a predetermined amount of the resin is metered, the rotation of the screw 20 is stopped and the injection operation is executed in which the screw 20 is driven in the axial direction. Thus, the resin is purged.

The continuous purge process 35 then executes step S12. That is, it is checked whether a termination condition is satisfied. During the injection operation in the purging, the control device 4 monitors the injection pressure. If there is no injection pressure abnormality, it is determined that the termination condition is not satisfied (NO), and the process returns to step S11. That is, the purging is repeated. On the other hand, if the injection pressure abnormality occurs, it is determined that the termination condition is satisfied (YES), and the continuous purge process 35 is completed. Incidentally, the injection pressure abnormality occurs when the injection pressure during the injection operation is high. That is, the injection pressure abnormality occurs when the temperature of the resin decreases and the viscosity increases. Since the temperature is sufficiently low, even if the purging is terminated upon detection of such injection pressure abnormality, there is no risk of resin deterioration thereafter. The continuous purge process 35 may be stopped by the operator operating the control device 4 (see FIG. 1), without waiting for the termination condition to be satisfied.

In the molding cycle stopping process according to the first illustrative embodiment, the temperature of the resin is lowered from the molding cycle execution temperature to the standby temperature, and the purging is repeatedly executed while the temperature is high. Therefore, there is no risk that the resin in the heating cylinder 19 (see FIG. 1) deteriorates when the molding cycle shifts from the operation state to the stop state. That is, even when the molding cycle is restarted, there is no deteriorated resin, so that molding defects such as inclusion of a black spot in a molded product can be prevented.

Second Illustrative Embodiment

Injection Molding Machine According to Second Illustrative Embodiment

Figure 4A:
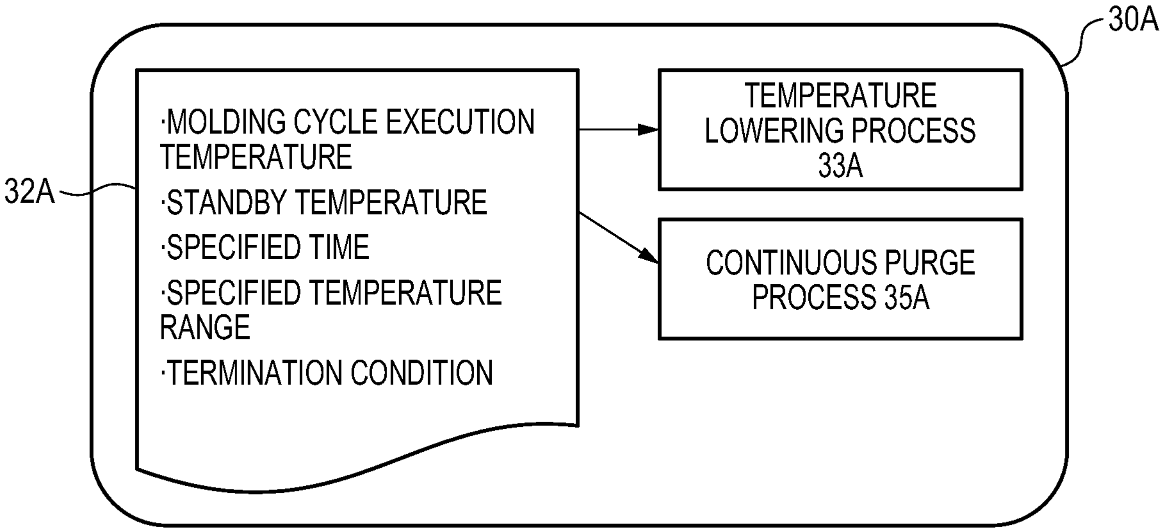
FIG. 4A is a block diagram showing a molding cycle stopping process software group according to a second illustrative embodiment.

For an injection molding machine according to a second illustrative embodiment, each device, each member, and the like are configured in the same manner as the injection molding machine 1 and the injection device 3 according to the first illustrative embodiment shown in FIGS. 1 and 2. Therefore, description of the devices, members, and the like will be omitted. The second illustrative embodiment is different from the first illustrative embodiment in a molding cycle stopping process software group 30A installed in the control device 4 as shown in FIG. 4A. The molding cycle stopping process software group 30A according to the second illustrative embodiment will be described.

{Molding Cycle Stopping Process Software Group}

The molding cycle stopping process software group 30A according to the second illustrative embodiment also includes a setting information file 32A, a temperature lowering process 33A, and a continuous purge process 35A. Among them, the continuous purge process 35A is configured in the same manner as the continuous purge process 35 (see FIG. 1) in the first illustrative embodiment, and thus description thereof will be omitted.

Similarly to the setting information file 32 (see FIG. 1) of the first illustrative embodiment, the setting information file 32A of the second illustrative embodiment stores the molding cycle execution temperature, the standby temperature, and the termination condition. The setting data is the same as that in the first illustrative embodiment, and the description thereof is omitted. The setting information file 32A of the second illustrative embodiment stores the following setting data as other setting data.

Specified Time

Specified Temperature Range

In the temperature lowering process 33A of the molding cycle stopping process according to the second illustrative embodiment, the resin temperature is lowered with a substantially constant temperature change as described below. The setting data is for making the temperature change constant.

{Molding Cycle Stopping Process}

When the operation of the molding cycle is stopped, the operator performs the operation of stopping the operation in the control device 4, and the molding cycle stopping process according to the second illustrative embodiment is performed. The control device 4 performs the temperature lowering process 33A and the continuous purge process 35A to be described below in parallel as the molding cycle stopping process according to the second illustrative embodiment.

{Temperature Lowering Process}

Figure 4B:
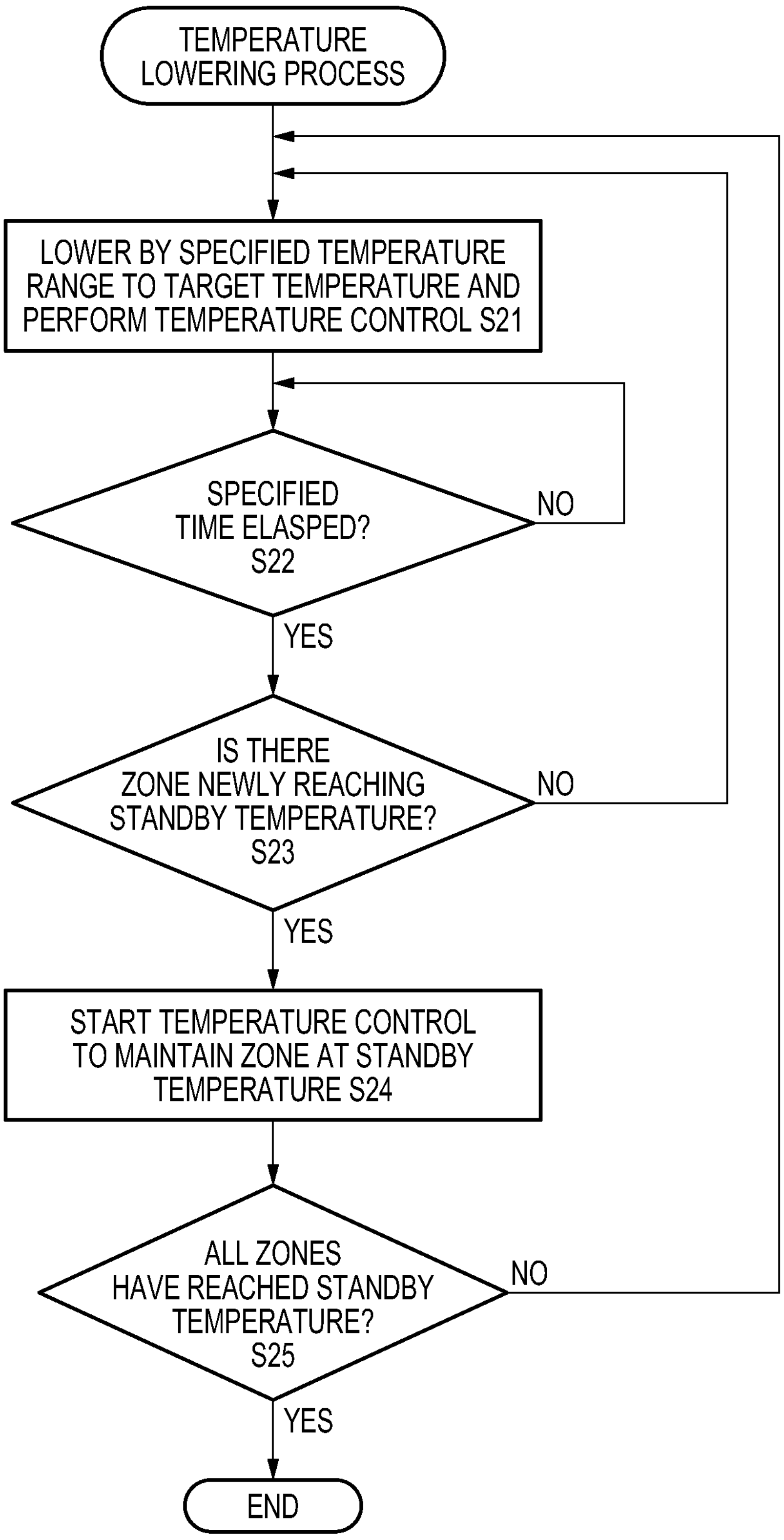
FIG. 4B is a flowchart showing a temperature lowering process in a molding cycle stopping process according to the second illustrative embodiment.

In the temperature lowering process 33A according to the second illustrative embodiment, step S21 is first executed as shown in FIG. 4B. In step S21, a target temperature is set for each of the zones H1, H2, . . . , and temperature control is performed. The target temperature is a temperature lower than the current temperature of the respective zones H1, H2, . . . by the specified temperature range set in the setting information file 32A. Next, step S22 is executed. That is, it is checked whether the specified time set in the setting information file 32A has elapsed. If the specified time has not elapsed (NO), the process is continued. If the specified time has elapsed (YES), the process proceeds to step S23.

In step S23, it is checked whether there is a zone reaching the standby temperature among the zones H1, H2, . . . . If not (NO), the process returns to step S21 to repeat the process. That is, for each of the zones H1, H2, . . . , the target temperature is further lowered by the specified temperature range, and temperature control is performed. On the other hand, if there is a zone reaching the standby temperature among the zones H1, H2, . . . (YES), step S24 is executed. That is, the temperature control is switched such that the standby temperature is constant for the zones H1, H2, . . . .

Next, step S25 is executed. In step S25, it is checked whether all the zones H1, H2, . . . have reached the standby temperature. If there is a zone not reaching the standby temperature among the zones H1, H2, . . . (NO), the process returns to step S21. If all the zones H1, H2, . . . have reached the standby temperature (YES), the temperature lowering process 33A is completed.

The continuous purge process 35A is the same as the continuous purge process 35 in the first illustrative embodiment, and a description thereof will be omitted.

In the molding cycle stopping process according to the second illustrative embodiment, a rate of temperature drop in each of the zones H1, H2, . . . can be made substantially constant. Accordingly, the purging is performed while stably lowering the resin temperature, and the deterioration of the resin in the heating cylinder 19 (see FIG. 1) can be reliably prevented.

Third Illustrative Embodiment

Injection Molding Machine According to Third Illustrative Embodiment

Figure 5A:
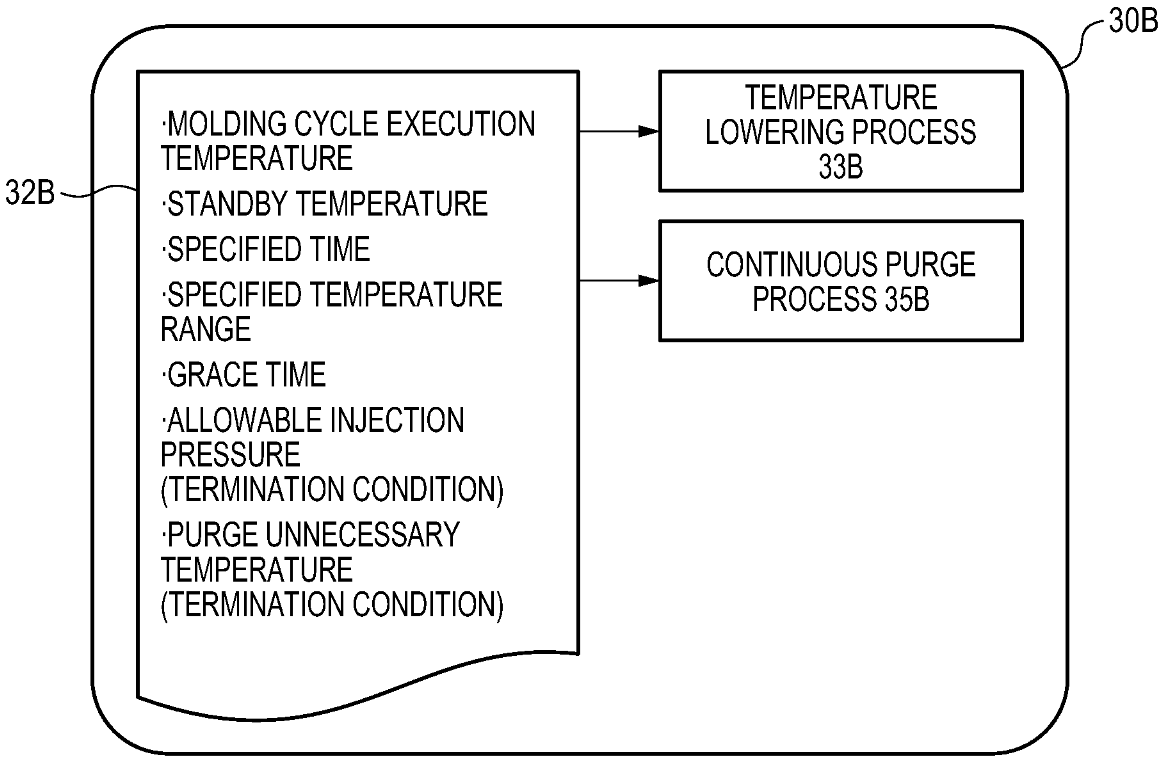
FIG. 5A is a block diagram showing a molding cycle stopping process software group according to a third illustrative embodiment.

For an injection molding machine according to a third illustrative embodiment, each device, each member, and the like are configured in the same manner as the injection molding machine 1 and the injection device 3 according to the first illustrative embodiment shown in FIGS. 1 and 2. Therefore, description of the devices, members, and the like will be omitted. The third illustrative embodiment is different from the first illustrative embodiment in a molding cycle stopping process software group 30B provided in the control device 4 as shown in FIG. 5A. The molding cycle stopping process software group 30B according to the third illustrative embodiment will be described.

{Molding Cycle Stopping Process Software Group}

The molding cycle stopping process software group 30B according to the third illustrative embodiment also includes a setting information file 32B, a temperature lowering process 33B, and a continuous purge process 35B.

Similarly to the setting information file 32A (see FIG. 4A) of the second illustrative embodiment, the setting information file 32B of the third illustrative embodiment stores the molding cycle execution temperature, the standby temperature, the specified time, and the specified temperature range. This is the same as the setting data described in the first and second illustrative embodiments, and the description thereof is omitted. In addition to the setting data, the following setting data is stored.

Grace Time

In the molding cycle stopping process according to the third illustrative embodiment, when the operation of the molding cycle is stopped, the control device 4 (see FIG. 1) detects the stop and shifts to the stop state. However, as described later, the shift to the stop state may be canceled. The grace time is a time period for the control device 4 to determine whether to cancel the shift to the stop state.

Allowable Injection Pressure

The allowable injection pressure is one of termination conditions for determining whether the continuous purge process 35B terminates the purging. In the first illustrative embodiment, the injection pressure abnormality generally provided in the injection molding machine 1 is adopted as the termination condition, and it is determined that the termination condition is satisfied when the injection pressure abnormality is detected in the injection operation of the purging. In the third illustrative embodiment, the allowable injection pressure is set separately from the injection pressure for detecting the injection pressure abnormality. These may be the same value or different values. When the injection pressure exceeding the allowable injection pressure is detected in the injection operation of the purging, it is determined that the termination condition is satisfied.

Purge Unnecessary Temperature

The purge unnecessary temperature is one of the termination conditions for determining whether the continuous purge process 35B terminates the purging. If the temperature of all the zones H1, H2, . . . (see FIG. 2) is lower than the purge unnecessary temperature, it is determined that the resin does not deteriorate, and the termination condition is satisfied. The purge unnecessary temperature may be the same temperature as the standby temperature, or may be higher than the standby temperature.

{Molding Cycle Stopping Process}

In the third illustrative embodiment, the operator may perform the operation of stopping the operation of the molding cycle in the control device 4 (see FIG. 1) and also explicitly instruct the performing of the molding cycle stopping process. However, in the molding cycle stopping process according to the third illustrative embodiment, when the operation of the molding cycle is stopped by the operator, the control device 4 detects the operator's stop operation and shifts to the stop state. This will be described below.

Figure 5B:
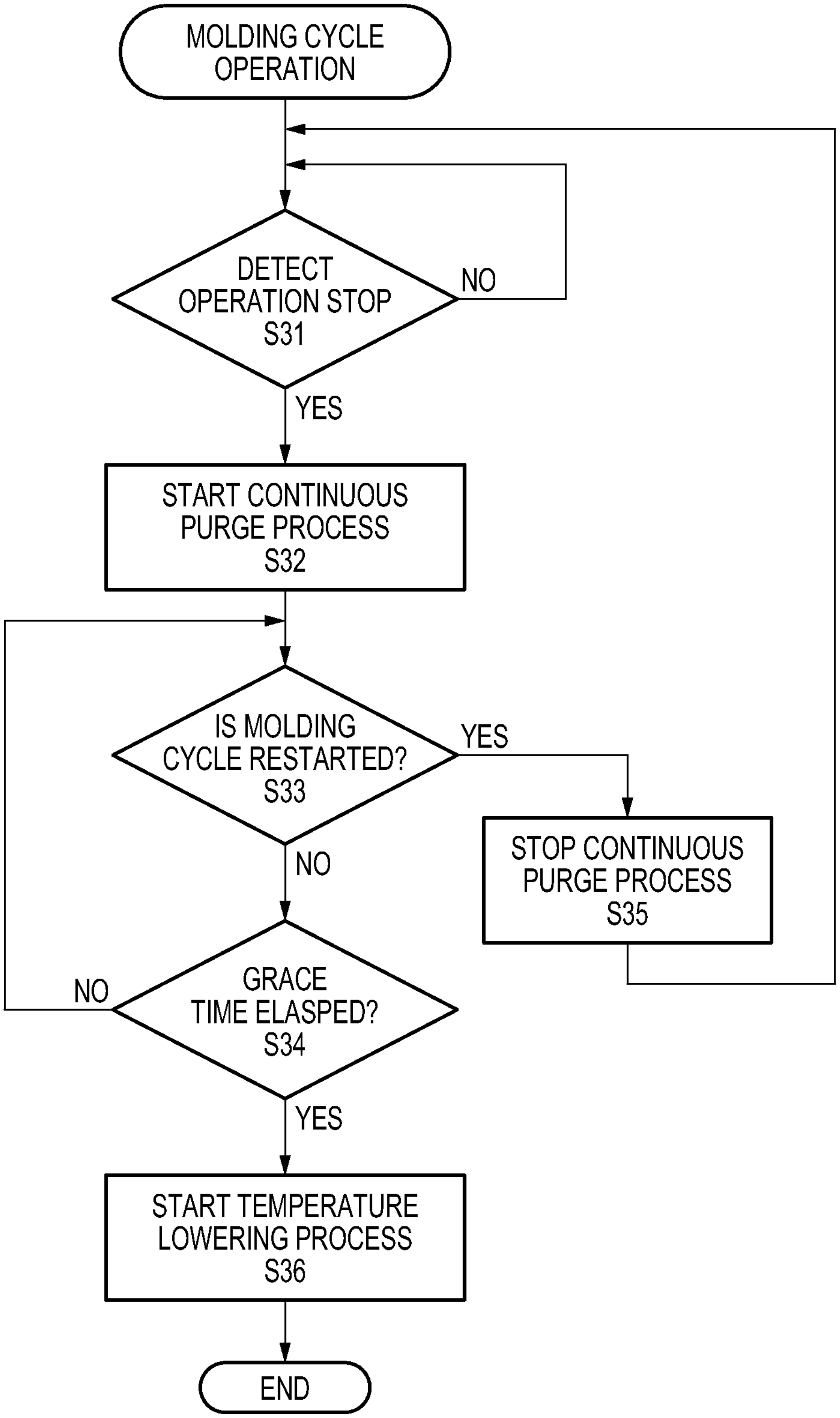
FIG. 5B is a flowchart showing a molding cycle stopping process according to the third illustrative embodiment.

The operator stops the molding cycle. Then, the control device 4 executes step S31 as shown in FIG. 5B. In step S31, the elapsed time since the stop is checked, and it is checked whether a predetermined specified time, for example, more than ten seconds has elapsed. If the time has not elapsed (NO), step S31 is continued. If the time has elapsed (YES), the control device 4 enters a preparatory stage for shift to the stop state. That is, the continuous purge process 35B is started in step S32. In the preparatory stage, the execution of the temperature lowering process 33B is suspended.

In the continuous purge process 35B, the metering operation and the injection operation are executed to perform the purging as in the first illustrative embodiment. If the termination condition is not satisfied, the purging is continued, and if the termination condition is satisfied, the purging is completed. In the third illustrative embodiment, two termination conditions of the continuous purge process 35B are provided as described above. That is, the allowable injection pressure and the purge unnecessary temperature. When the injection pressure exceeding the allowable injection pressure is detected in the injection operation of the purging, it is determined that the termination condition is satisfied. Alternatively, if it is detected that the temperature of all the zones H1, H2, . . . (see FIG. 2) is lower than the purge unnecessary temperature, it is determined that the termination condition is satisfied.

After the continuous purge process 35B is started in step S32, the control device 4 executes step S33. That is, it is determined whether the molding cycle is restarted by the operator. If the molding cycle is not restarted (NO), step S34 is executed to determine whether the grace time has elapsed. If the grace time has not elapsed (NO), the process returns to step S33. On the other hand, in step S33, if the restart of the molding cycle by the operator is detected (YES), step S35 is executed. That is, the continuous purge process 35B being executed is stopped. Next, the process returns to step S31. That is, the temperature lowering process 33B is not executed, and the shift to the stop state is cancelled. Thereafter, the control device 4 performs a molding cycle.

If it is determined in step S34 that the grace time has elapsed (YES), the control device 4 ends the preparatory stage and starts shifting to the stop state. That is, the temperature lowering process 33B is started in step S36. In the third illustrative embodiment, the temperature lowering process 33B is the same as the temperature lowering process 33A (FIG. 4A) in the second illustrative embodiment, and a description thereof will be omitted.

When the temperature lowering process 33B is started and a predetermined time has elapsed, the continuous purge process 35B, which is already being executed, ends when one of the termination conditions described above is satisfied. When the standby temperature is reached for all zones H1, H2, . . . , the temperature lowering process 33B is also terminated as described above. That is, the molding cycle stopping process is completed.

In the molding cycle stopping process according to the third illustrative embodiment, the control device 4 (see FIG. 1) detects the stop of the operation of the molding cycle and determines whether to shift to the stop state. Accordingly, it is possible to safely shift to the stop state before the resin in the heating cylinder 19 deteriorates. Further, in the molding cycle stopping process according to the third illustrative embodiment, a preparatory stage before the shift to the stop state is provided with the grace time. Accordingly, when a stop time of the operation of the molding cycle is short and the operation is restarted early, the temperature of the resin does not drop, and the operation can be restarted efficiently.

Modifications

The first, second, and third illustrative embodiments may be modified in various ways. For example, other conditions may be adopted as the termination condition. For example, the torque during rotation of the screw 20 may be adopted as the termination condition. When the temperature of the resin decreases, the torque increases. When the torque during the rotation of the screw 20 reaches a specified allowable torque, it can be determined that the termination condition is satisfied. Further, the termination condition may be satisfied when other abnormal states are detected. For example, an abnormal state such as resin material shortage. If the material runs out, when performing the metering operation in the continuous purge process 35, even if the screw 20 is rotated, the metering is not done properly. When a metering time exceeds a specified time or when an abnormal rotation occurs in which the screw 20 does not retreat, it is naturally necessary to terminate the continuous purge process 35. That is, the occurrence of such an abnormality can also be regarded as the termination condition.

Although the invention made by the present inventors is specifically described based on the illustrative embodiments, it is needless to say that the present invention is not limited to the illustrative embodiments described above, and various modifications can be made without departing from the scope of the invention. The plurality of examples described above may be appropriately combined.

What is claimed is:

1. A molding cycle stopping method, comprising:
in a case of stopping an operation of a molding cycle in an injection device including a heating cylinder and a screw provided in the heating cylinder,
performing a temperature lowering process including lowering a temperature of the heating cylinder from a molding cycle execution temperature to a standby temperature; and
performing a continuous purge process including repeatedly purging a resin until a predetermined termination condition is satisfied,
wherein the continuous purge process further includes repeatedly performing a metering operation and an injection operation,
the metering operation including rotating the screw to measure the resin,
the injection operation including driving the screw in an axial direction to inject the resin, and
wherein the predetermined termination condition is that an injection pressure in the injection operation exceeds a specified allowable injection pressure.

2. The molding cycle stopping method according to claim 1, wherein the temperature lowering process includes, based on a preset specified time and a preset specified temperature range, lowering the temperature of the heating cylinder by the specified temperature range every specified time.

3. The molding cycle stopping method according to claim 2,
wherein the molding cycle execution temperature is different for each zone that is a division in a length direction of the heating cylinder, and
wherein the specified temperature range is a temperature range common to each zone.

4. The molding cycle stopping method according to claim 1,
wherein the continuous purge process is started based on detecting a stop of the operation of the molding cycle,
wherein in the temperature lowering process, the lowering of the temperature of the heating cylinder is delayed until a preset grace time after detecting the stop of the operation of the molding cycle, and the lowering of the temperature is started after the grace time has elapsed, and
wherein in a case where a restart of the operation of the molding cycle is detected before the grace time has elapsed, performing of the temperature lowering process is canceled and the continuous purge process is stopped.

5. The molding cycle stopping method of claim 1, wherein the standby temperature is a temperature between 10-30 degrees Celsius above a glass transition or melting point of the resin.

6. The molding cycle stopping method according to claim 1, wherein the allowable injection pressure is set separately from an injection pressure for detecting an injection pressure abnormality.

7. An injection device comprising:
a heating cylinder;
a screw placed in the heating cylinder; and
a control device,
wherein the control device is configured to perform a molding cycle stopping process based on detecting a stop of an operation of a molding cycle, and wherein the molding cycle stopping process includes:

a temperature lowering process including lowering a temperature of the heating cylinder from a molding cycle execution temperature to a standby temperature; and a continuous purge process including repeatedly purging a resin until a predetermined termination condition is satisfied, wherein the continuous purge process further includes repeatedly performing a metering operation and an injection operation, the metering operation including rotating the screw to measure the resin, the injection operation including driving the screw in an axial direction to inject the resin, and wherein the predetermined termination condition is that an injection pressure in the injection operation exceeds a specified allowable injection pressure.

8. The injection device according to claim 7, wherein in the temperature lowering process, based on a preset specified time and a preset specified temperature range, the control device is configured to lower the temperature of the heating cylinder by the specified temperature range every specified time.

9. The injection device according to claim 8, wherein the molding cycle execution temperature is different for each zone that is a division in a length direction of the heating cylinder, and wherein the specified temperature range is a temperature range common to each zone.

10. The injection device according to claim 7, wherein the control device is configured to:

start the continuous purge process based on detecting the stop of the operation of the molding cycle, in the temperature lowering process, delay a start of the lowering of the temperature of the heating cylinder until a preset grace time has elapsed after detecting the stop of the operation of the molding cycle, and start the lowering of the temperature after the grace time has elapsed, and in a case where a restart of the operation of the molding cycle is detected before the grace time has elapsed, cancel the performing of the temperature lowering process and stop the continuous purge process.

11. An injection molding machine comprising:

an injection device including:

a heating cylinder; and a screw placed in the heating cylinder;

a mold clamping device; and a control device, wherein the control device is configured to perform a molding cycle stopping process based on detecting a stop of an operation of a molding cycle, and wherein the molding cycle stopping process includes:

a temperature lowering process including lowering a temperature of the heating cylinder from a molding cycle execution temperature to a standby temperature; and a continuous purge process including repeatedly purging a resin until a predetermined termination condition is satisfied, wherein the continuous purge process further includes repeatedly performing a metering operation and an injection operation, the metering operation including rotating the screw to measure the resin, the injection operation including driving the screw in an axial direction to inject the resin, and wherein the predetermined termination condition is that an injection pressure in the injection operation exceeds a specified allowable injection pressure.

12. The injection molding machine according to claim 11, wherein in the temperature lowering process, based on a preset specified time and a preset specified temperature range, the control device is configured to lower the temperature of the heating cylinder by the specified temperature range every specified time.

* * * * *